July 31, 1928.

L. L. NEEBE 1,679,257

THROTTLE VALVE

Filed Aug. 10, 1926

Inventor:
Lawrence L. Neebe
by his Attorneys,
Howson & Howson

July 31, 1928.  
L. L. NEEBE  
THROTTLE VALVE  
Filed Aug. 10, 1926

Inventor:
Lawrence L. Neebe
by his Attorneys,

Patented July 31, 1928.

1,679,257

UNITED STATES PATENT OFFICE.

LAWRENCE L. NEEBE, OF WOODBURY, NEW JERSEY.

THROTTLE VALVE.

Application filed August 10, 1926. Serial No. 128,444.

My invention relates to certain improvements in throttle-valves, particularly of the type located in the smoke-box of a locomotive and which is connected to the super-heater and cylinders of the locomotive.

One object of the invention is to so construct the throttle-valve that, when the valve is open, there will be a direct flow of steam from the passage leading from the super-heater to the passage leading to the cylinders.

A further object of the invention is to make the valve in the form of a cylinder, which is located within a cylindrical bushing which extends across the passage leading to the cylinders.

Figure 1:
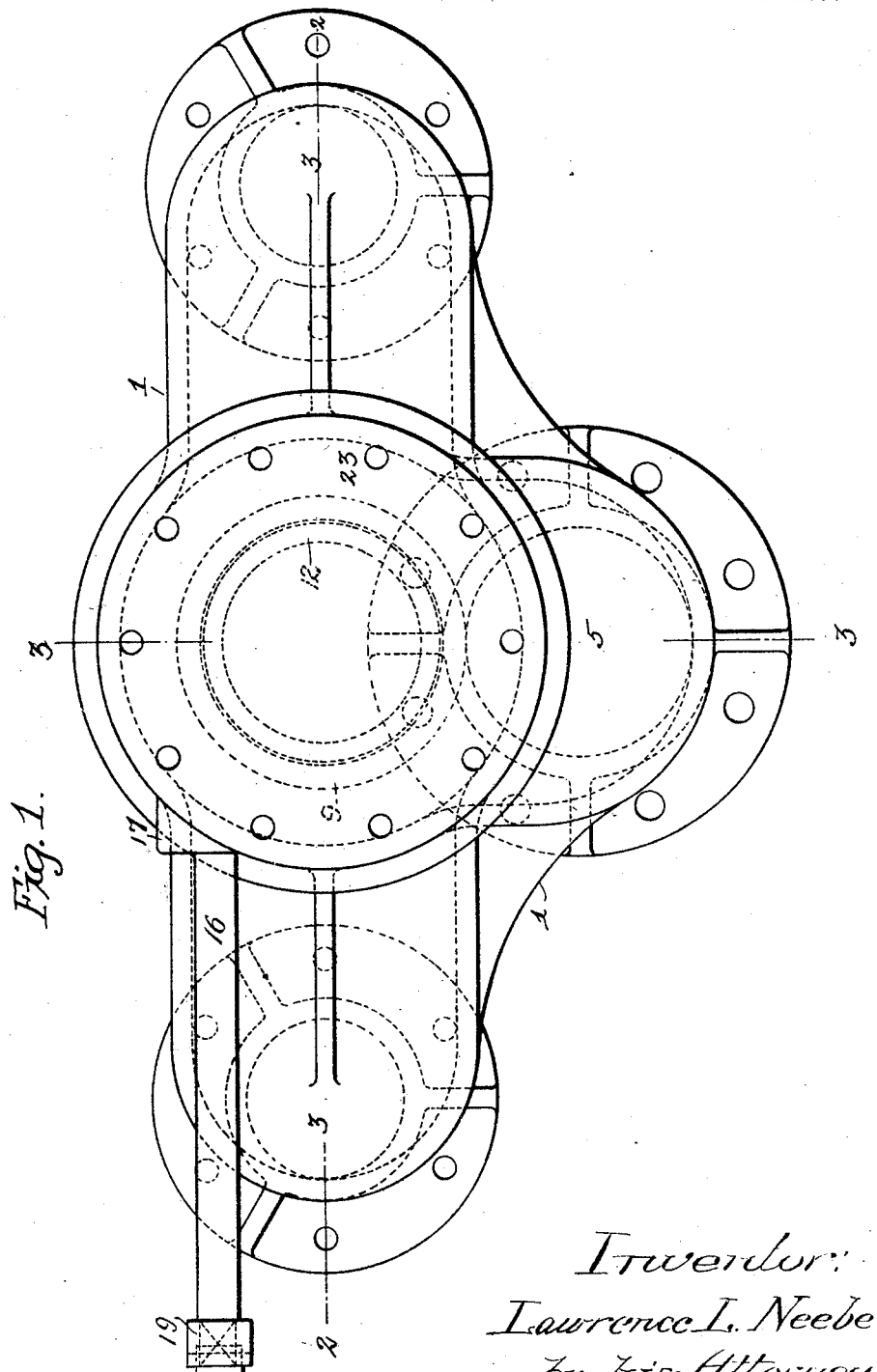
Fig. 1 is a plan view of my improved throttle-valve.
Figure 2:
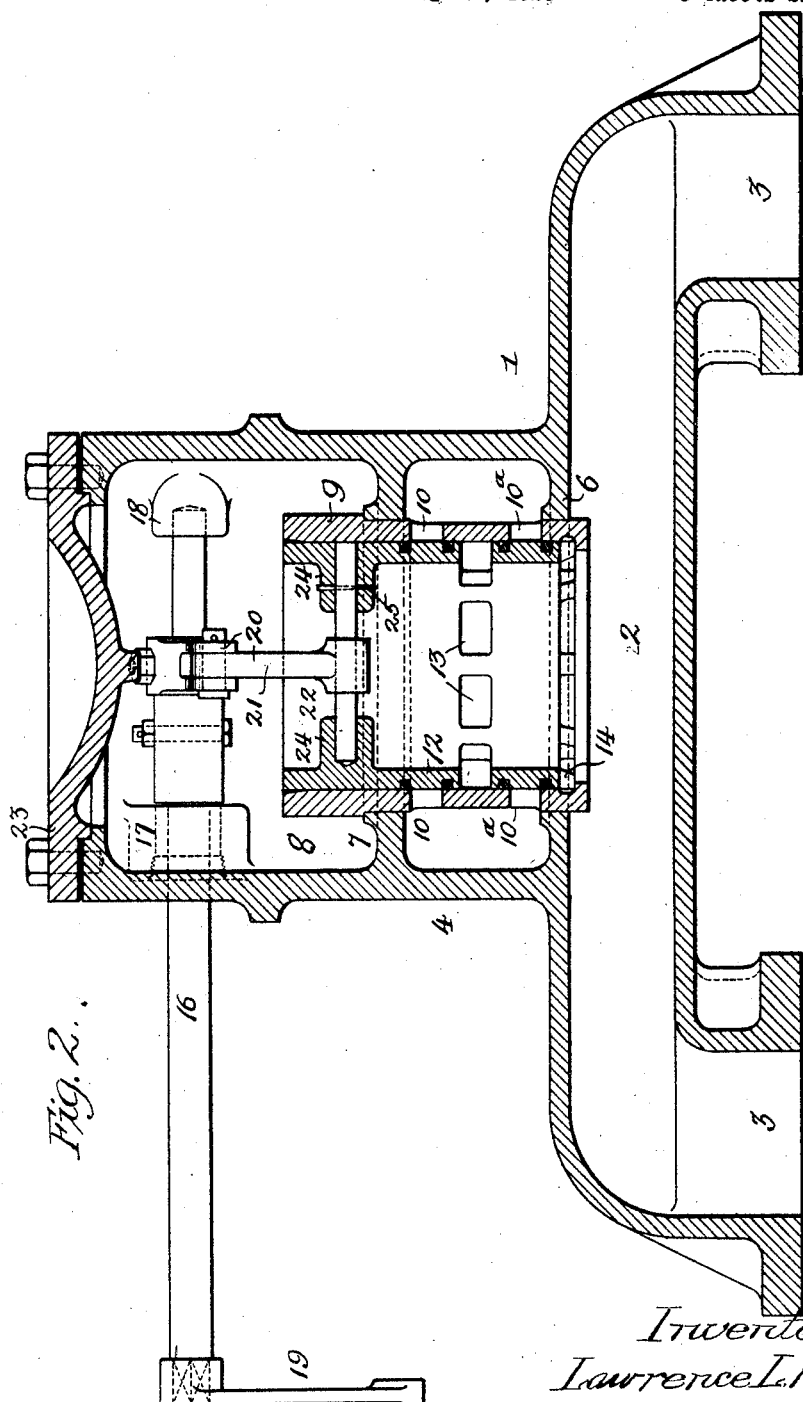
Fig. 2 is a vertical sectional view on the line 2—2, Fig. 1.
Figure 3:
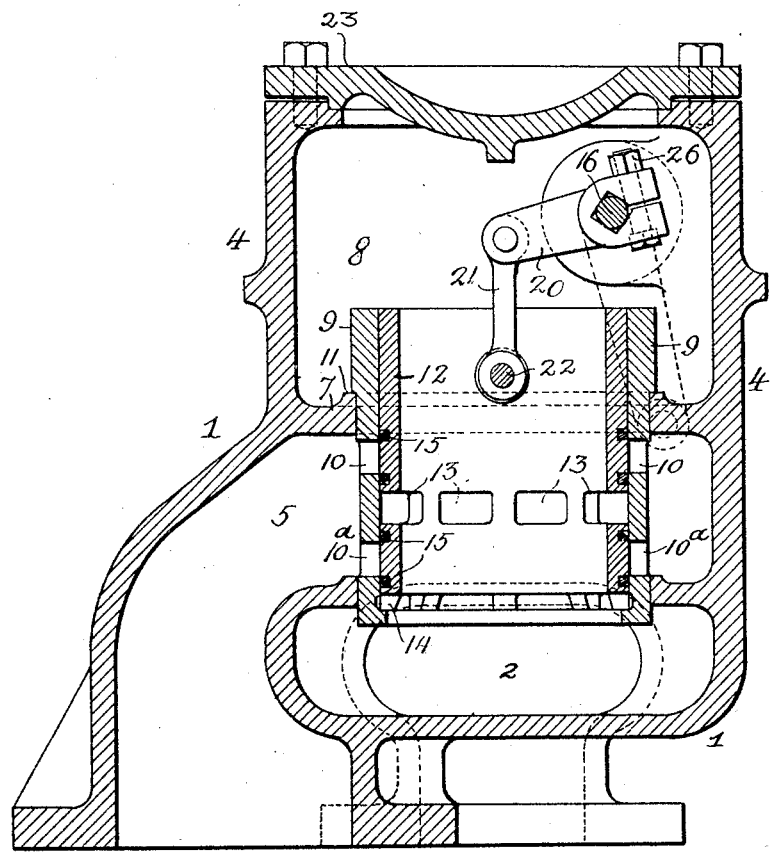
Fig. 3 is a sectional view on the line 3—3, Fig. 1.

1 is a valve-casing having a transverse passage 2 at its lower end, turned at right angles in the present instance as at 3 to form connections with the super-heater or other steam supplying means. In the central portion 4 of the valve-casing is located the valve structure. Directly above the passage 2 in the valve-casing is a transverse passage 5 which is connected to the pipes leading to the cylinders. A partition 7 separates the passage 5 from the chamber 8 in the upper portion of the throttle-valve casing.

Extending through openings in the two partitions is a cylindrical bushing 9 having ports 10—10ª. This bushing is driven to its seat in the valve-casing, the upper portion of the bushing having a shoulder 11 fitting against the upper surface of the partition 7. Within the bushing is a cylindrical valve 12 having ports 13, arranged to align with the upper series of ports 10 when the valve is raised. At the lower end of the valve are a series of projections 14 which span the ports 10ª when the valve is raised, so as to prevent interference with the movement of the valve. The valve has a series of packing rings 15.

16 is a valve operating shaft, which extends into the upper end of the valve-casing and is mounted in bearings 17 and 18. The outer end of the shaft 19 has an arm which is connected to operating means in the cab of the locomotive. Secured to the shaft 16 is an arm 20, which is connected by a link 21 to a cross-bar 22 secured to a valve 12, so that on turning the shaft 16, the valve can be raised to open the ports to any degree desired.

The pin 22 extends through one side of the valve 12 and has bearings in the bosses 24 and is secured from turning by a pin 25. The arm 20 is split so as to form a clamp by which it is secured to the shaft 16, a bolt 26 securely clamping the arm to the shaft.

The chamber 8 is closed by a cover-plate 23. The steam, passing through the passages 2 and 3, passes up through the centre of the valve and into the chamber 8. When the throttle-valve is raised, the steam flows through the ports 13, and under the valve, into and through the ports 10—10ª, and into the passage 5 which leads to the cylinders. By this construction a very efficient and simply balanced valve is provided, which can be readily operated and which will admit a large quantity of steam to the cylinders.

While this invention is particularly adapted for use in the smoke-box of a locomotive, it may be used in other places without departing from the essential features of the invention.

I claim:—

The combination in a smoke-box throttle-valve, of a valve-casing having a transverse passage at its lower end arranged to be coupled to a super-heater, and having a central extension in which is a passage leading to the cylinders, said two passages being separated by a horizontal partition; a chamber above the passage leading to the cylinders and separated from said chamber by a second partition; a bushing extending through both partitions and having two sets of ports therein, one set being above the other set; a cylindrical valve located in the bushing and having a single series of ports arranged to align with the upper series of ports in the bushing when the valve is raised, the lower end of the valve opening the lower series of ports; an operating shaft; an arm on said shaft; and a link connecting the arm with the valve.

LAWRENCE L. NEEBE.